United States Patent
Bizard

(10) Patent No.: US 8,390,231 B2
(45) Date of Patent: Mar. 5, 2013

(54) METHOD FOR OBTAINING A CRITERION FOR DETECTING OBSTACLES TO THE CLOSURE OF AN OPENING

(75) Inventor: Paul Bizard, Lagny sur Marne (FR)

(73) Assignee: Inteva Products France SAS (FR)

( * ) Notice: Subject to any disclaimer, the term of this patent is extended or adjusted under 35 U.S.C. 154(b) by 328 days.

(21) Appl. No.: 12/818,476

(22) Filed: Jun. 18, 2010

(65) Prior Publication Data

US 2010/0319268 A1 Dec. 23, 2010

(30) Foreign Application Priority Data

Jun. 19, 2009 (FR) .................................... 09 02982

(51) Int. Cl.
*H02H 7/085* (2006.01)
(52) U.S. Cl. ......... 318/469; 318/434; 318/459; 318/461
(58) Field of Classification Search .......... 318/264–266, 318/272, 275, 277, 282, 286, 434, 461, 466–469, 318/479, 504, 626, 459
See application file for complete search history.

(56) References Cited

U.S. PATENT DOCUMENTS

| | | | |
|---|---|---|---|
| 4,097,788 A * | 6/1978 | Nygaard et al. | 318/271 |
| 4,776,433 A * | 10/1988 | Lagree et al. | 187/316 |
| 5,351,439 A | 10/1994 | Takeda et al. | |
| 5,770,934 A * | 6/1998 | Theile | 318/469 |
| 5,977,732 A | 11/1999 | Matsumoto | |
| 5,994,858 A | 11/1999 | Miura | |
| 6,051,945 A | 4/2000 | Furukawa | |
| 6,118,243 A * | 9/2000 | Reed et al. | 318/468 |
| 6,426,604 B1 * | 7/2002 | Ito et al. | 318/466 |

FOREIGN PATENT DOCUMENTS

| | | |
|---|---|---|
| DE | 10042169 A1 | 3/2002 |
| EP | 1637682 A1 | 3/2006 |

OTHER PUBLICATIONS

French Search Report for FR0902982 dated May 25, 2010.

* cited by examiner

*Primary Examiner* — Bentsu Ro
(74) *Attorney, Agent, or Firm* — Cantor Colburn LLP

(57) ABSTRACT

The invention relates to a method for obtaining a criterion for detecting obstacles in a closure movement of a motor-driven opening. The obtaining method includes the step of determining a speed of rotation of a motor shaft and the step of determining a quantity representative of a motor voltage. The detection criterion is then obtained by a step for calculating the criterion according to the speed of rotation of the motor shaft and the quantity representative of the motor voltage. This makes it possible to obtain a criterion, which is both robust and inexpensive, for detecting obstacles in a closure movement of a motor-driven opening.

5 Claims, 1 Drawing Sheet

METHOD FOR OBTAINING A CRITERION FOR DETECTING OBSTACLES TO THE CLOSURE OF AN OPENING

REFERENCE TO RELATED APPLICATION

This application claims priority to French Patent Application No. FR 0902982 filed Jun. 19, 2009.

BACKGROUND OF THE INVENTION

The present invention relates to a method for obtaining a criterion for detecting obstacles in a closure movement of a motor-driven opening.

When closing openings, it is important to be able to detect the presence of obstacles to the closure. For example, when closing a door window in the automobile field, it is useful to detect the presence of a body part of a user that would prevent the closure of the opening in order to avoid pinching.

In the field of motor-driven openings, the absence of detection, by an appropriate criterion, of an obstacle that prevents the closure of the opening may cause damage to the motor, the control mechanism, the opening, and/or the obstacle.

Particularly in the field of automobiles, the motor-driven openings require the use of a robust detection criterion, making it possible to differentiate the presence of an obstacle and the contact of the opening with a sealing device or closure seal of the opening in the closed position. Various indirect detection criteria have been proposed for openings whose closure is motor-driven.

However, the anti-pinching standards are becoming increasingly stringent and in particular when the opening reaches the closure seal. The proposed detection criteria are not entirely satisfactory in terms of robustness and cost.

There is therefore a need to obtain a robust and inexpensive criterion for detecting obstacles in the closure movement of a motor-driven opening.

SUMMARY OF THE INVENTION

A method for obtaining a criterion for detecting obstacles in a closure movement of a motor-driven opening includes the steps of determining a speed of rotation of a motor shaft, determining a quantity representative of a motor voltage, and calculating the obstacle detection criterion according to the speed of rotation of the motor shaft and the quantity representative of the motor voltage.

According to a variant, the obstacle detection criterion is obtained by the formula:

$$Tr = Ur - K*w$$

in which

Tr is a quantity representative of the resisting torque applied to the motor shaft;

Ur is the quantity representative of the motor voltage;

K is the torque constant of the motor; and w is the speed of rotation of the motor shaft.

According to a variant, the speed of rotation of the motor shaft is controlled by a feedback loop. According to a variant, the quantity representative of the motor voltage is determined by measuring the voltage of the motor controlled by the feedback loop. According to a variant, the step of determining the quantity representative of the motor voltage includes a substep of filtering the motor voltage following a substep of measuring the motor voltage. According to a variant, the step of determining the quantity representative of the motor voltage includes the substeps of measuring the motor voltage, phasing of the motor voltage with the speed of rotation of the shaft into a phased voltage, the quantity representative of the motor voltage being the phased voltage. According to a variant, the step of determining the quantity representative of the motor voltage includes, between the substeps of measuring the motor voltage and phasing, the substeps of recording the motor voltage in a table as a function of time, and determining a phase shift between the last motor voltage recorded and the determined speed of rotation of the motor shaft. The substep of phasing the motor voltage is performed by extracting from the table the motor voltage phase-shifted by the determined phase-shift value, and the extracted value is retained as the phased voltage value.

A method of detecting obstacles in the closure movement of a motor-driven opening includes the steps of obtaining of a criterion for detecting obstacles in the closure movement of the opening according to the method for obtaining an obstacle detection criterion as described previously and comparing the obstacle detection criterion with a threshold value.

An obstacle detection device implements the method as described previously.

A motor-driven system for operating vehicle openings includes the device as described previously.

BRIEF DESCRIPTION OF THE DRAWINGS

Other features and advantages of the invention will become apparent from reading the following detailed description of the embodiments of the invention, given solely as examples and with reference to the drawings which show.

DETAILED DESCRIPTION OF THE PREFERRED EMBODIMENT

Figure 1:
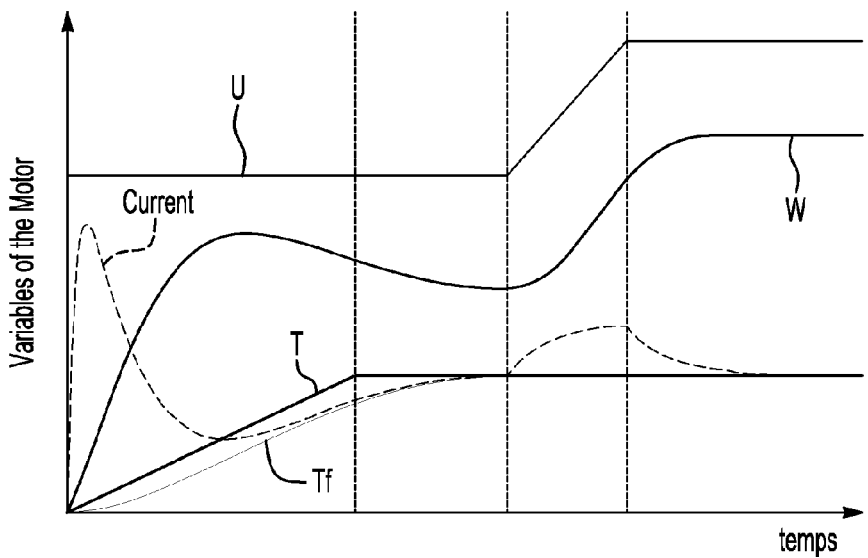
FIG. 1 illustrates a graph of the trend of different variables of a motor for closing an opening as a function of time.

The invention relates to a method for obtaining a criterion for detecting obstacles in a closure movement of a motor-driven opening with speed regulation. The obtaining method includes the step of determining a speed of rotation of a motor shaft and the step of determining a quantity representative of the motor voltage. The detection criterion is then obtained by a step of calculating the criterion according to the speed of rotation of the motor shaft and the quantity representative of the motor voltage.

In the field of motor-driven openings of automobiles, the requirements of anti-pinching standards require a more robust or even more reliable detection criterion to be obtained. In practice, the anti-pinching standards are particularly demanding when it comes to detecting an obstacle when an opening approaches a closure position. It is then preferable to regulate the speed. The speed is, for example, regulated using a reference speed profile. The regulation of the speed is thus linked to the position of the opening during the closure. As the opening approaches the closure position, the speed of rotation of the motor can thus be reduced.

The reduction in the speed increases the detection performance and makes it possible to differentiate the presence of an obstacle from the contact of the opening against, for example, a sealing device of the closed opening. The reduction in the speed also allows for a greater responsiveness in the detection function in relation to the speed of closure. When using certain detection criteria, the regulation of the speed may result in conflict between the speed regulation function and the obstacle detection function.

Firstly, the speed regulation interferes with the use of the speed of rotation of the motor shaft as a robust detection criterion. In practice, the speed of the motor shaft, or of the opening, varies during closure of the opening. Therefore, the regulated speed is not a characteristic of the presence or absence of an obstacle.

Next, the speed regulation prevents the use of the motor voltage because the motor voltage is used to control the speed regulation. Another function of the speed feedback is to increase or reduce the motor voltage to control the speed of closure of the opening. For example, the speed of the shaft is reduced on approaching the roof seal, or the top seal of the door. The motor voltage therefore varies independently of the presence of an obstacle. Obstacle detection based on the use of a criterion linked to the motor current can then be envisaged.

However, the use of the motor current as a detection criterion entails the use of a specific sensor, a current intensity sensor. The intensity of the motor current is, furthermore, polluted by the motor supply noise, in other words "ripple noise," or even the noise due to the speed regulation. Finally, the motor current is affected by the additional electrical torque needed when a change of speed is ordered to overcome inertia.

The use of a detection criterion based both on the speed of rotation of the motor shaft and on the motor voltage avoids these drawbacks. On the one hand, this criterion does not require the current to be measured and therefore the use of a specific sensor. On the other hand, the detection criterion based both on the speed of rotation of the motor shaft and on the motor voltage makes it possible to compensate for the variations of the motor voltage during regulation with the corresponding speed variation.

The use of such a criterion thus makes it possible to overcome the drawbacks of the separate use of these two quantities, such as, for example, the reduced visibility of the obstacle. Such a criterion is then robust, in other words reliable. The use of such a criterion also makes it possible to obtain an economical, or inexpensive, detection criterion in as much as it does not require any other sensors than those already required for the speed regulation function. The invention ultimately makes it possible to obtain a criterion that is both robust and inexpensive for detecting obstacles in a closure movement of a motor-driven opening.

It is also possible to use the criterion obtained by the method for openings whose speed of closure is not regulated. It is then possible to use this method for obtaining a detection criterion for all the motor-driven openings without having to be concerned with the installation or non-installation of a speed regulation function. This therefore makes it possible to develop a single type of method for obtaining detection criteria and therefore to minimize the design costs. Such a method for obtaining a detection criterion for openings with non-regulated closure speed thus remains robust, or reliable, and makes it possible to obtain a saving.

The step for calculating the obstacle detection criterion is preferably obtained by the formula:

$$Tr = Ur - K \times w$$

where Ur is the quantity representative of the motor voltage, K is the torque constant of the motor, w is the speed of rotation of the motor shaft, and Tr is a quantity representative of the resisting torque applied to the motor shaft.

The criterion obtained by the method then devolves from the set of mechanical and electrical equations of a direct current motor:

$$\begin{cases} U = R \times I + K \times w \\ J \times \frac{dw}{dt} = K \times I - T \end{cases}$$

where U is the motor voltage, R is the motor resistance, I is the current, K is the torque constant of the motor, w is the speed of rotation of the motor shaft, J is the inertia, and T is the resisting mechanical torque applied to the motor shaft.

The set of equations is resolved in T:

$$T = \frac{K}{R} \times U - \frac{K^2}{R} \times \left( w + \frac{R \times J}{K^2} \times \frac{dw}{dt} \right).$$

The response time of the motor is identified:

$$\tau_{em} = \frac{R \times J}{K^2}.$$

The following equation is then obtained:

$$T = \frac{K}{R} \times U - \frac{K^2}{R} \times \left( w + \tau_{em} \times \frac{dw}{dt} \right).$$

A Laplace transform is applied, the manipulation of this equation being more difficult in the time domain and allowing for a more compact expression:

$$T(s) = \frac{K}{R} \times U(s) - \frac{K^2}{R} \times (w(s) + \tau_{em} \times s \times w(s)).$$

The equation is then simplified to:

$$T(s) = \frac{K}{R} \times U(s) - \frac{K^2}{R} \times w(s) \times (1 + \tau_{em} \times s),$$

or even to:

$$\frac{T(s)}{1 + \tau_{em} \times s} = \frac{K}{R} \times \frac{U(s)}{1 + \tau_{em} \times s} - \frac{K^2}{R} \times w(s).$$

Tf is then taken to be the filtered torque with, as time constant, the motor response time, in other words:

$$Tf(s) = \frac{T(s)}{1 + \tau_{em} \times s}.$$

Which allows us to simplify the preceding equation to:

$$T(s) = \frac{K}{R} \times \left[ \frac{U(s)}{1 + \tau_{em} \times s} - K \times w(s) \right].$$

Uf is then taken to be the filtered voltage with, as time constant, the motor response time, in other words:

$$Uf(s) = \frac{U(s)}{1 + \tau_{em} \times s}.$$

Which allows us to simplify the preceding equation to:

$$Tf(s) = \frac{K}{R} \times [Uf(s) - K \times w(s)].$$

By applying the inverse Laplace transform, we obtain:

$$Tf = \frac{K}{R} \times (Uf - K \times w).$$

FIG. 1 is a graph illustrating the variation of the different motor variables, Tf, U, w, as a function of time, Tf being obtained by the preceding formula. FIG. 1 also shows an increase in the motor voltage linked to the speed regulation increasing the motor speed w.

The term K/R of the preceding formula is a constant term characteristic of the properties of the motor. This term represents a simple gain. Thus, in the interests of saving on computation power, the result obtained can be expressed as a voltage. There is thus a saving of a line of calculation. It is then possible to calculate a quantity representative of the torque Tr by using the formula:

$$Tr = Uf - K \times w.$$

It is also possible to save on the filtering of the motor voltage to a voltage Uf. The filtered voltage Uf is then replaced by a quantity representative of the motor voltage Ur as, for example, the motor voltage. The following is then finally obtained:

$$Tr = Uf - K \times w$$

Following the method, there is thus obtained a quantity which estimates the resisting torque on the motor shaft. This estimation of the resisting torque may then be indirect, in that a specific force sensor can be dispensed with.

The resisting torque on the motor shaft is characteristic of the presence of an obstacle preventing the closure of the opening. This criterion is proportional to the portion of the current linked to the resisting torque but independent of the portion of the current linked to the motor voltage.

In practice, as illustrated in FIG. 1, the estimated torque T does not vary when the speed is increased by regulation. The future variations of T are then characteristic of the presence of an obstacle independently of the speed regulation.

The resisting torque therefore makes it possible to obtain a detection criterion that is robust because it is independent of the opening's closure speed regulation function.

The method for obtaining a detection criterion can be used for the closure of a motor-driven opening whose motor speed is controlled by a feedback loop. The feedback loop makes it possible to check that the regulated speed is indeed reached by the rotation of the motor shaft. The feedback loop then readjusts the motor voltage to reach the desired speed according to the current speed of rotation of the motor shaft. The feedback loop may interfere with the reliability or the robustness of the obstacle detection with detection criteria such as the motor voltage alone or the speed of rotation alone.

Thus, when the opening encounters an obstacle, the speed of the opening, and therefore the speed of rotation of the shaft, tends to decrease because of the resistive forces. However, the feedback function reacts and increases the motor power supply voltage to keep the speed at its original value, the speed of rotation of the motor shaft being proportional to the motor power supply voltage.

Therefore, when a detection criterion such as the speed of rotation of the motor shaft is used, the speed feedback may reduce the visibility of the obstacle by trying to maintain a constant speed.

Moreover, the use of a detection criterion such as the motor voltage may interfere with the correct detection of the presence of an obstacle. In practice, the variation of the motor voltage is also characteristic of other situations that are not associated with the presence of an obstacle. The motor current is, furthermore, slightly unstable in response to the variations of the torque because of the closed loop configuration.

A method for obtaining a detection criterion, culminating in a detection criterion according to the speed of rotation and a quantity representative of the motor voltage is therefore particularly useful. The speed of rotation of the motor shaft can also be determined by the use of any type of conventional shaft rotation speed sensor. The speed of rotation of the shaft can also be determined indirectly by any opening closure speed sensor. The quantity characteristic of the motor voltage can be determined directly by likening the quantity characteristic of the motor voltage to a voltage measurement using a voltage sensor at the terminals of the motor.

It is, however, possible, in the case of a motor speed feedback loop, to measure the voltage of the motor controlled by the feedback loop in order to be able to determine a representative quantity. It is then assumed that the voltage of the controlled motor does indeed represent the motor voltage. In practice, the direct use of a motor voltage measurement to obtain the obstacle detection criterion may be difficult. The speed of closure of the opening is, in fact, controlled during the feedback by variations in the motor voltage. The variation of the motor voltage is then implemented by pulse width modulations. Such an implementation may generate a large amount of noise in the motor voltage signal. The use of the controlled voltage to determine the representative quantity makes it possible to overcome these possible noises associated with the speed feedback loop.

It is also possible to determine the quantity representative of the motor voltage by likening the motor voltage to any other quantities representative of the motor voltage. It is then sufficient for this representative quantity to be available in a system implementing the obtaining method. For example, sensors are installed for the speed regulation function. This availability means there is no need for specific acquisition means when implementing the obtaining method.

It is also possible to determine the quantity characteristic of the motor voltage by measuring the motor voltage, whether controlled or not, then by filtering the motor voltage to a filtered voltage. The filtering makes it possible, where appropriate, to eliminate a large quantity of noise that may interfere with the reliability of the detection criterion obtained.

The step for determining the quantity representative of the motor voltage then includes a substep for filtering the motor voltage following a substep for measuring the motor voltage.

Thus, if using the method for obtaining the detection criterion according to the formula $Tr=Uf-K \times w$, it is possible to use as the quantity representative of the motor voltage Uf, the voltage filtered by the response time constant of the motor. We then come back to the formula:

$$Tr = Uf - K \times w.$$

FIG. 1 illustrates the variation of the filtered torque Tf as a function of time during an increase in the motor voltage by the closure speed regulation. The filter can, for example, be a first order filter. The return to this formula in order to calculate the criterion is tantamount in reality to filtering, in this case to the first order, the motor voltage by using the following formula:

$$Uf_n = P \times Uf_{n-1} + (1-P) \times \left(\frac{Uc_n + Uc_{n-1}}{2}\right),$$

where Ufn is the filtered voltage at the instant n, Ufn−1 is the filtered voltage at the preceding instance n−1, Ucn is the motor voltage at the instant n, Ucn−1 is the motor voltage at the preceding instant n−1. Ucn and Ucn−1 may be motor voltages controlled by the feedback loop. Finally, P is obtained by the following formula:

$$P = e^{\frac{\Delta t}{\tau em}},$$

in which Δt is the voltage sampling interval between the instant n and the instant n−1. The sampling interval may be, for example, 3 ms in the field of automobile openings. For clarity hereinafter in the explanation, the term motor voltage encompasses the notions of motor voltage, filtered motor voltage, controlled motor voltage and filtered controlled motor voltage.

The determination step of the method may include, following a substep of measuring the motor voltage, a substep for phasing the motor voltage. This step is also called synchronization or alignment substep. The phasing is done relative to the speed of rotation of the shaft determined in a preceding step of the obtaining method. There is then obtained a motor voltage phased with the speed of rotation of the motor shaft. This phased motor voltage can then be used as quantity representative of the motor voltage.

In practice, depending on the sensors used, the motor voltage and the speed of rotation of the shaft may be determined for instants that are not synchronized with one another. The speed may be determined at an instant m whereas the voltage is determined at an instant n.

A conventional sensor is, for example, used with a sampling over time of the measured voltage in order to determine a quantity representative of the motor voltage. In the interests of convenience, more often than not a constant-interval sampling is used, with, for example, an interval of 3 ms in the field of automobile openings. When such a sensor is used with a Hall effect sensor to determine the speed of rotation of the motor shaft, the two determined quantities are then not synchronized.

A Hall effect sensor for determining the speed of rotation is used in conjunction with an oriented magnet on the motor shaft. During the rotation of the shaft, the orientation of the magnet changes and the Hall effect sensor then records the changes of orientation. The frequency of the changes of orientation then makes it possible to determine the speed of rotation of the shaft. However, this speed of rotation of the shaft has not been determined according to a constant-interval time sampling. The speed has been sampled with an interval that depends on the speed of rotation of the motor shaft itself.

The shaft rotation speed sensor may be of interest for its use by functions independent of the detection function, such as the regulation or even feedback function. The speed sensor makes it possible in practice to determine the position of the opening during its closure to regulate the speed and/or check the closure speed feedback. The other uses of the speed sensor explain why, in the interests of saving on sensors, we seek to make use of the speed determined by a Hall effect type sensor.

The phasing makes it possible to avoid desynchronization between the determined speed of rotation and the motor voltage. With desynchronization no longer a factor, the presence of noise is avoided, because of the time offset, for the detection criterion. This noise may, in practice, reduce the reliability and the robustness of the detection criterion.

Such phasing therefore makes it possible to increase the reliability and the robustness of the detection criterion, while saving on any additional sensors.

Figure 2:
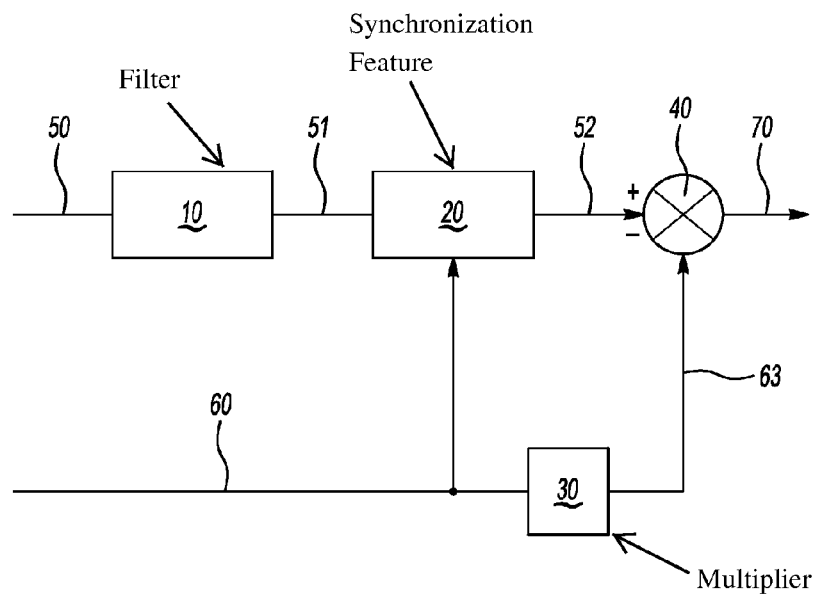
FIG. 2 illustrates a diagram schematically representing the obtaining of a detection criterion.

FIG. 2 uses a diagram to schematically illustrate an embodiment of the method for obtaining a detection criterion with a phasing substep. The speed of rotation of the motor shaft 60 is determined. The motor voltage 50, or the controlled motor voltage, is measured. This voltage is filtered by a filter 10 to obtain a filtered voltage 51. The filtered voltage 51 is then phase aligned using a phasing or synchronization feature 20 to obtain a phased voltage 52. After having multiplied the speed of rotation of the motor shaft 60 by the constant of the motor in a multiplier 30, the value obtained 63 is subtracted in 40 from the phased voltage 52 to obtain the detection criterion 70.

In the step of determining the quantity representative of the motor voltage, the phasing substep may be preceded by phasing preparation substeps. Thus, following the substep of measuring the motor voltage, it is possible to provide a first substep of recording the motor voltage in a table. The table then records the different motor voltages as a function of time. Provision can be made for the last motor voltage to be recorded in the first cell of the table, the preceding motor voltages then being offset in the table.

The substep for recording the last motor voltage (the nth motor voltage) is then represented by the following formula:

Table[$0$]=$U_n$.

A second substep is provided, for determining the phase shift between the last motor voltage, measured at the instant n and then recorded, and the speed of rotation of the motor shaft, determined at the instant m.

If a Hall effect sensor is used, the speed of rotation of the motor shaft is determined for a sampling whose interval depends on the speed of rotation. Thus, when the speed of rotation is high, the sampling interval is low, the orientation of the magnet on the motor shaft changing a greater number of times during one and the same time interval. On the other hand, when the speed of rotation is lower, the sampling interval is greater.

This link between the sampling interval (or period) and the speed of rotation makes it possible to use the speed of rotation to determine which is the interval, in time, of the last speed sampling. This last speed sampling interval is then compared with the motor voltage sampling constant interval. This comparison allows us ultimately to determine the phase shift, in terms of number of constant sampling intervals, between the measurement of the speed of rotation and the last voltage recorded in the table.

In the embodiment of the method including the phase shift recording and determination substeps, the phasing substep is performed by extracting the motor voltage phase-shifted by the determined phase shift from the table. This voltage is then the phasing voltage.

Using the preceding representation of the recording substep, and by taking k to be the phase shift in terms of number of constant sampling intervals, the phasing substep can be represented by the formula:

$U_{n-k}$=Table[$k$].

The quantity representative of the voltage is then identified with the phased voltage for the step for calculating the detection criterion.

The calculation step can then be performed according to the formula:

$$Tr = U_{n-k} - k \times w_m$$

where $w_m$ is the last determined speed, i.e., the speed determined at the instant m.

In the embodiments that have just been described, the phase shift recording and determination substeps are thus inserted between the motor voltage measurement and phasing substeps.

The invention also proposes a method for detecting obstacles in the closure movement of a motor-driven opening. This detection method then uses one of the embodiments of the method for obtaining a detection criterion described previously, then compares the criterion obtained with a threshold value. The comparison with this threshold value then makes it possible to determine the presence or absence of an obstacle.

The detection of an obstacle may be followed by a stopping of the opening's closure motor, the reversal of the direction of rotation of the motor or else any other reaction making it possible to avoid damaging the motor, the control mechanism, the opening, or the obstacle. It is possible, for example, to issue an audible or visual alert.

A detection device is capable of implementing the detection method. The detection method and the detection device benefit from the advantages of the method for obtaining the detection criterion, such as its robustness or its inexpensiveness.

A motor-driven system for operating vehicle openings with speed regulation includes the detection device capable of implementing the detection method. The opening may be a window, a sliding roof, a door, a trunk lid, a tailgate, a sunscreen curtain, or even any kind of opening known in the automobile field. The operating system may be, for example, a window regulator or an operating system of a sliding roof.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. A method for obtaining a criterion for detecting obstacles in a closure movement of a motor-driven opening, the method comprising the steps of:
   determining a speed of rotation of a motor shaft;
   determining a quantity representative of a motor voltage; and
   calculating obstacle detection criterion according to the speed of rotation of the motor shaft and the quantity representative of the motor voltage, wherein the speed of rotation of the motor shaft is controlled by a feedback loop and wherein the quantity representative of the motor voltage is determined by measuring the motor voltage controlled by the feedback loop.

2. The method according to claim 1, wherein the step of calculating the obstacle detection criterion is obtained by the formula:

$$Tr = Ur - K*w$$

in which
   Tr is a quantity representative of a resisting torque applied to the motor shaft;
   Ur is a quantity representative of the motor voltage;
   K is a torque constant of the motor; and
   w is the speed of rotation of the motor shaft.

3. A method for obtaining a criterion for detecting obstacles in a closure movement of a motor-driven opening, the method comprising the steps of:
   determining a speed of rotation of a motor shaft;
   determining a quantity representative of a motor voltage; and
   calculating obstacle detection criterion according to the speed of rotation of the motor shaft and the quantity representative of the motor voltage, wherein the step of determining the quantity representative of the motor voltage includes a substep of filtering the motor voltage following a substep of measuring the motor voltage.

4. A method for obtaining a criterion for detecting obstacles in a closure movement of a motor-driven opening, the method comprising the steps of:
   determining a speed of rotation of a motor shaft;
   determining a quantity representative of a motor voltage; and
   calculating obstacle detection criterion according to the speed of rotation of the motor shaft and the quantity representative of the motor voltage, wherein the step of determining the quantity representative of the motor voltage includes the substeps of: measuring the motor voltage; and phasing of the motor voltage with the speed of rotation of the motor shaft into a phased voltage, wherein the quantity representative of the motor voltage is the phased voltage.

5. The method according to claim 4, wherein the step of determining the quantity representative of the motor voltage further includes, between the substep of measuring the motor voltage and the sub step of phasing, the substeps of: recording the motor voltage in a table as a function of time; and determining a phase shift between a last motor voltage recorded and the determined speed of rotation of the motor shaft, wherein the substep of phasing the motor voltage is performed by extracting from the table the motor voltage phase-shifted by the determined phase-shift value, and an extracted value is retained as a phased voltage value.

* * * * *